Nov. 22, 1960     F. D. JONES     2,960,813
CORN HARVESTER
Filed Oct. 13, 1958
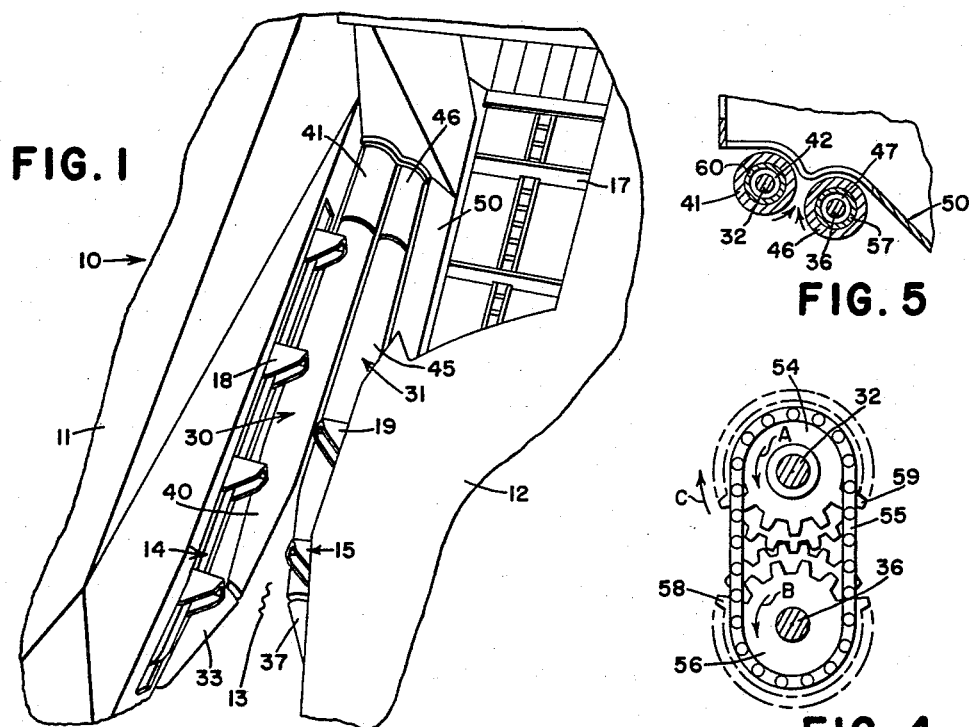
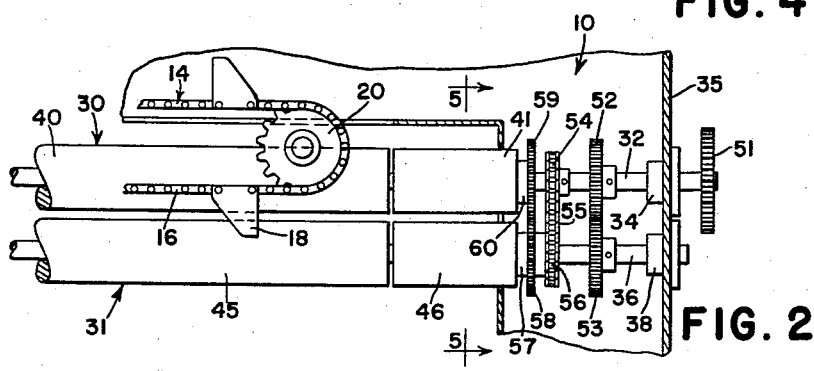
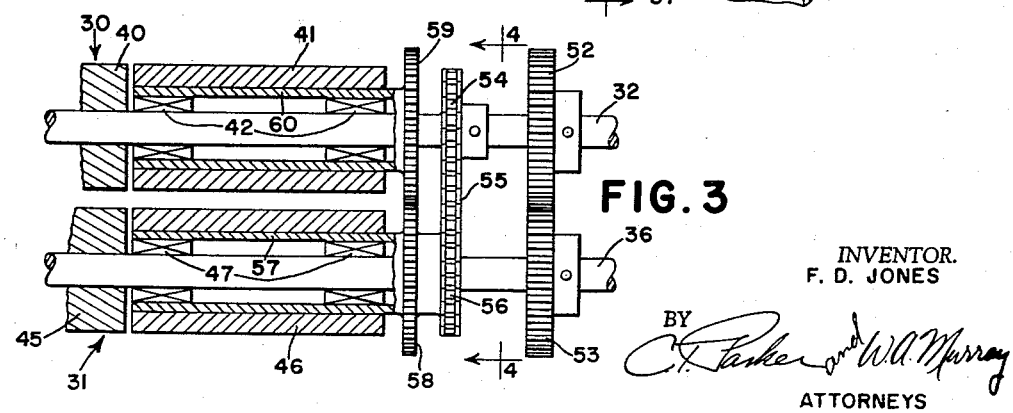
INVENTOR.
F. D. JONES
BY
ATTORNEYS

United States Patent Office 2,960,813
Patented Nov. 22, 1960

2,960,813

CORN HARVESTER

Frank D. Jones, Moline, Ill., assignor to Deere & Company, Moline, Ill., a corporation of Delaware Filed Oct. 13, 1958, Ser. No. 766,828

9 Claims. (Cl. 56—106)

This invention relates to a corn harvester and more particularly to the harvesting mechanism used in the harvester. Still more particularly this invention relates to a new and novel type of snapping roll mechanism used for detaching ears of corn from their stalks and for eliminating trash from the harvesting area of the harvester.

In the conventional type of corn harvester there is normally provided housing structure defining a fore-and-aft extending stalk passage which receives successive stalks of a row of corn as the harvester moves forwardly over the field. Positioned on opposite sides of the stalk passage are a pair of gathering chains having rearwardly moving runs with lugs extending into the passage and engaging the stalks for moving them rearwardly in the passage. Further provided is harvesting mechanism for detaching the ears of corn from the stalks in the form of a pair of fore-and-aft extending snapping rolls on opposite sides of the passage and rotatably mounted on the harvester so that the adjacent sides of the rolls move downwardly to cause the ears to be detached from the stalks upon their contacting the rolls.

In this type of corn harvester, there is normally created a problem of eliminating trash accumulated at the rear end of the snapping rolls. The trash normally consists of an accumulation of stalk fragments, leaves, weeds, and other foreign matter which will in many instances be too light for the snapping rolls to get a positive grip to discharge them downwardly and out of the harvester. Consequently they will eventually clog the unit since no provision is made to eliminate them. This is one of the major causes of field shutdowns in the harvesting of corn.

It is the primary object of the present invention to provide a pair of snapping roll mechanisms which include a pair of forward snapping roll sections and a pair of rear roll sections, the forward sections of which rotate to draw the stalks downwardly and the rear sections of which rotate to move material upwardly. The roll mechanisms are of such length that normally the stalks will have already passed through the forward snapping roll sections prior to reaching the rear roll sections. Consequently the rear roll sections will operate to move trash upwardly from between the rolls.

It is a further feature of the present invention to dispose the roll mechanisms on opposite sides of the stalk passage and to mount the forward sections so that their rear ends are transversely opposite the rear end of the chain. Obviously, therefore, the rear sections will be positioned to the rear of the gathering chains and the gathering chains will not engage the stalks at the time they are in engagement with the rear roll sections.

It is still a further feature of the present invention to provide with the above described roll mechanisms the provision that one of the rear roll sections is disposed at a higher level than the other rear roll section so that material or trash cleared from the rolls will have a gravitational tendency to move to one side of the roll mechanisms and into a side elevator which feeds into a crop treating unit.

It should be recognized that the present structure will become particularly effective in use with corn harvesters mounted on the forward end of shelling or combine units in which shelling of the corn occurs immediately following the harvesting of the ears. In the normal type of combine or shelling unit, trash may be moved through the unit without injury or causing clogging of that unit.

Other objects and advantages of the present invention will become apparent to those skilled in the art as the nature of the invention is better understood from the following description and as shown in the accompanying drawings.

Fig. 1 is a front perspective view of the forward portion of the corn harvester.

Fig. 2 is a plan view of the rear portions of the roll mechanisms and their associated drive.

Fig. 3 is an enlarged sectional view of the rear portion of the roll mechanism and the associated drive.

Fig. 4 is a sectional view taken substantially along the line 4—4 of Fig. 3.

Fig. 5 is a sectional view taken substantially along the line 5—5 of Fig. 2.

The harvester herein to be described includes housing structure, indicated in its entirety by the reference numeral 10, which has styling structure 11 and 12 on opposite sides of and defining a fore-and-aft extending stalk passage 13. The housing structure has gathering points, shown only partially, which extend forwardly and gather the stalks into the stalk passage 13. Positioned on opposite sides of the stalk passage 13 and supported by the housing structure is a pair of gathering chains 14, 15. The gathering chain 14 has a chain run 16 extending substantially the length of the stalk passage 13 with the rear end of the run terminating substantially at the rear end of the passage 13. The chain 15 has an inner run adjacent to the stalk passage and on the opposite sides of the passage 13 than the run 16 of the chain 14 and terminates considerably forwardly of the rear end of the chain 14, the styling 12 on that side also terminating forwardly to provide a passage for the ears harvested from the stalks to move into a side conveyor 17. The chains 14, 15 have lugs 18, 19 respectively which extend into the stalk passage and aid in movement of the stalks rearwardly in the passage. The chains 14, 15 are mounted over suitable chain sprockets, one of which is shown at 20 in Fig. 2, and are driven by suitable drive means, usually provided at the forward end of the gathering chains. The details of the drive mechanism for the gathering chains 14, 15 is not considered necessary for full appreciation of the present invention. However, should more detail of the drive mechanism be desired, such may be obtained by referring to U.S. Patent 2,525,058.

Positioned on opposite sides of the stalk passage 13 are a pair of roll mechanisms 30, 31. The roll mechanism 30 includes a fore-and-aft extending shaft 32 journaled at its forward end in a journal housing 33 and at its rear end in a bearing 34 supported by wall structure 35 which is part of a housing structure 10. Similarly the roll mechanism 31 includes a fore-and-aft extending shaft 36 which is journaled at its forward end in a journal housing 37 and at its rear end by a bearing 38 which is also fixed to the wall structure 35. The roll mechanism 30 includes a forward roll section 40 and a rear roll section 41. The forward roll section 40 is fixed to rotate in unison with the shaft 32. The rear section 41 is axially coextensive with the forward section 40 and is mounted on the rear portion of the shaft 32 by means of bearings 42 which permit relative rotation between the section 41 and the shaft 32. In like manner, the roll mechanism 31 is composed of a forward roll section 45 and a rear roll section 46, the forward section 45 being fixed to the shaft 36 and the rear section 46 being mounted on the shaft 36 by means of bearings 47.

Viewing Fig. 2, it becomes obvious that the forward roll sections 40, 45 are disposed transversely opposite of the chain run 16, having their rear ends terminating substantially opposite the rear terminal end of the chain run 16. Obviously, therefore, the rear roll sections 41, 46 are rearward of the chain 14. The location of the rear sections 41, 46 becomes important inasmuch as the sections are rotated so that their adjacent sides move upwardly. Since the lugs 18 on the chain 14 will not move in the area of the rear sections 41, 46, stalks and trash moving upwardly as a result of the rotation of the sections 41, 46 will not be further broken or dragged into the harvester by the lugs 18. Consequently, the trash and stalks which are driven upwardly by the sections 41, 46 will not be under the influence of the gathering chains 14, 15 but will be dependent for further movement by other characteristics of the harvester, presently to be explained.

It will be noted, viewing Fig. 5, that the bearing members 34, 38 are so positioned in the wall structure 35 that the rear roll section 41 is disposed at a higher level than the rear roll section 46. This feature of having one roll positioned above the other roll causes the stalks and other trash accumulated in this area to tend to gravitate to one side of the roll mechanisms. As is apparent, the stalks and other trash will tend to gravitate onto a plate member 50 to be conveyed into the side conveyor 17.

Drive mechanisms for the roll mechanisms 30, 31 include a gear 51 mounted on the shaft 32 and positioned rearwardly of the wall 35. Suitable drive mechanism, which is not shown will tend to rotate the shaft 32 in a counterclockwise direction as viewed in Fig. 4. Fixed to the shafts 32, 36 are a pair of meshing gears 52, 53. Since the forward sections 30, 31 are fixed to the shafts 32, 36 the forward roll sections 30, 31 will consequently rotate in a direction whereby their adjacent sides move in a downward direction. Also fixed to the shaft 32 is a sprocket 54 having a chain 55 mounted thereon and which extends over a sprocket 56 on the shaft viewed. The sprocket 56 has an axially extending tubular portion 57 which serves as the internal support for the rear roll section 46 and which is journaled for rotation on the bearings 47. Integral with the portion 57 is a gear 58. The gear 58 meshes with a gear 59 which has an axially extending portion 60 which serves as the internal support for the rear roll section 41 and which is journaled on the bearings 42.

Reviewing the operation of the drive mechanism, since the shaft 32 tends to move in a counterclockwise direction, as indicated by the arrow A, the chain and sprocket drive 54, 55, 56 will drive the gear 58, axial portion 57, and the rear roll section 46 in a counterclockwise direction as indicated by the arrow B. The intermeshing gear 58 will cause the gear 59 and the rear roll section 41 to move in a clockwise direction as indicated by the arrow C. It may therefore be seen that the portion of the drive mechanism including the sprocket drive 54, 55, 56 and the gears 58, 59 operate as reversing mechanisms causing the rear sections 41, 46 to move in a direction of rotation whereby their adjacent sides move upwardly or in a direction of rotation opposite to their respective shafts 32, 38.

In operation, it is desirable to provide the roll mechanisms 30, 31 to be of such length whereby the forward sections 40, 45 will operate to drive the stalks downwardly and to detach the ears from the stalks at that point. It is generally desirable, to have the stalks clear of the forward roll sections by the time the stalks reach the rear roll sections 41, 46. However, if the ears are not removed at that point, the roll sections 41, 46 will tend only to drive the stalks upwardly and to feed the stalks and the attached ears into the side conveyor 17. Generally husking mechanisms, shelling mechanisms, or the conventional type of corn shelling combine are of such structure to handle a limited quantity of trash without effecting efficient operation thereof. Consequently, the small amount of trash which is driven into the side conveyor 17 may be easily handled by the corn treating units used in conjunction with the harvesting mechanism.

While only one form of the invention has been shown, it should be recognized that other forms and variations will undoubtedly occur to those skilled in the art. Therefore, it should be understood that while the present detailed description was given for the purpose of concising and completely illustrating the principles of the invention, it was not the intention to so limit or narrow the invention beyond the broad general concepts herein claimed.

What is claimed is:

1. A harvesting mechanism for a corn harvester having a housing structure defining a fore-and-aft extending stalk passage receiving stalks of corn as the harvester moves forwardly, and chain means having a fore-and-aft extending run adjacent the passage with its terminal end adjacent the rear end of the passage, said harvesting mechanism comprising: a pair of fore-and-aft extending snapping rolls on opposite sides of the passage, each roll including a forward section adjacent the forward section of the other roll and a rear section adjacent the rear section of the other roll, the forward and rear sections of each roll being axially coextensive, said forward section having a rear end transversely opposite the terminal end of the chain run, and said rear section being disposed rearwardly of the chain run; means rotating the snapping rolls for effecting rotation of the forward sections to cause the adjacent sides thereof to move downwardly and for effecting rotation of the rear sections to cause the adjacent sides thereof to move upwardly; and means mounting the pair of rolls in the housing structure whereby the rear section of one roll is above the rear section of the adjacent roll to effect movement of material to one side of the rolls.

2. A harvesting mechanism for a corn harvester having a housing structure defining a fore-and-aft extending stalk passage receiving stalks of corn as the harvester moves forwardly, and chain means having a fore-and-aft extending run adjacent the passage with its terminal end adjacent the rear end of the passage, said harvesting mechanism comprising: a pair of fore-and-aft extending snapping rolls on opposite sides of the passage, each roll including a forward section adjacent the forward section of the other roll and a rear section adjacent the rear section of the other roll, the forward and rear sections of each roll being axially coextensive, said forward section having a rear end transversely opposite the terminal end of the chain run, and said rear section being disposed rearwardly of the chain run; means rotating the snapping rolls for effecting rotation of the forward sections to cause the adjacent sides thereof to move downwardly and for effecting rotation of the rear sections to cause the adjacent sides thereof to move upwardly; and means mounting the pair of rolls in the housing structure.

3. A harvesting mechanism for a corn harvester having a housing structure defining a fore-and-aft extending stalk passage receiving stalks of corn as the harvester moves forwardly, said harvesting mechanism comprising: a pair of fore-and-aft extending snapping rolls on opposite sides of the passage, each roll including a forward section adjacent the forward section of the other roll and a rear section adjacent the rear section of the other roll, the forward and rear sections of each roll being axially coextensive, means rotating the forward sections to cause the adjacent sides thereof to move downwardly for drawing said stalks downwardly to effect detachment of the ears; means rotating the rear sections to cause the adjacent sides thereof to move upwardly for moving trash and stalk portions upwardly; and means mounting the pair of rolls in the housing structure whereby the rear section of one roll is above the rear section of the adjacent roll to effect movement of material to one side of the rolls.

4. A harvesting mechanism for a corn harvester having a housing structure defining a fore-and-aft extending stalk passage receiving stalks of corn as the harvester moves forwardly, said harvesting mechanism comprising: a pair of fore-and-aft extending snapping roll mechanisms on opposite sides of the passage, each roll mechanism including a forward roll section and a rear roll section, means rotating the forward roll sections to cause the adjacent sides thereof to move downwardly for drawing said stalks downwardly to effect detachment of the ears; means rotating the rear roll sections to cause the adjacent sides thereof to move upwardly for moving trash and stalk portions upwardly; and means mounting the pair of roll mechanisms in the housing structure whereby one rear roll section is above the other rear roll section to effect movement of material to one side of the roll mechanisms.

5. A harvesting mechanism for a corn harvester having a housing structure defining a fore-and-aft extending stalk passage receiving stalks of corn as the harvester moves forwardly, said harvesting mechanism comprising: a pair of fore-and-aft extending snapping roll mechanisms on opposite sides of the passage, each roll mechanism including a forward roll section and a rear roll section, means rotating the forward roll sections to cause the adjacent sides thereof to move downwardly for drawing said stalks downwardly to effect detachment of the ears; means rotating the rear roll sections to cause the adjacent sides thereof to move upwardly for moving trash and stalk portions upwardly; and means mounting the pair of roll mechanisms in the housing structure.

6. The invention defined in claim 5 in which the pair of roll mechanisms include a pair of fore-and-aft extending shafts substantially parallel with one another, and a forward and a rear section are mounted on each of the shafts, one of the respective sections being rigidly mounted on the shaft and the other of said sections being rotatably mounted on the shaft; and the drive means includes a means for rotating one of the shafts, a direct drive between the shafts to effect rotation of one shaft in response to rotation of the other, and a reversing drive mechanism mounted on the shafts and connected to said other of said sections for effecting rotation of the latter sections in opposite directions of rotation than their respective supporting shafts.

7. In a corn harvester having a housing structure defining a fore-and-aft extending stalk passage receiving stalks of corn as the harvester moves forwardly, and chain means having a fore-and-aft extending run adjacent the passage with its terminal end adjacent the run end of the passage, a pair of fore-and-aft extending ear detaching mechanisms on opposite sides of the passage, each mechanism including a forward ear detaching section adjacent a forward ear detaching section of the opposite mechanism and a coextensive rear roll section adjacent a rear roll section of the other mechanism, said forward section having a rear end transversely opposite the terminal end of the chain run, and said rear roll section being disposed rearwardly of the chain run; means effecting rotation of the roll sections to cause the adjacent sides thereof to move upwardly; and means mounting the ear-detaching mechanisms in the housing structure whereby one roll section is above the adjacent roll section to effect movement of material to one side of the roll sections.

8. In a corn harvester having a housing structure defining a fore-and-aft extending stalk passage receiving stalks of corn as the harvester moves forwardly, a pair of fore-and-aft extending ear detaching mechanisms on opposite sides of the passage, each mechanism including a forward ear detaching section adjacent a forward ear detaching section of the opposite mechanism and a coextensive rear roll section adjacent a rear roll section of the other mechanism; means effecting rotation of the roll sections to cause the adjacent sides thereof to move upwardly; and means mounting the ear-detaching mechanisms in the housing structure whereby one roll section is above the adjacent roll section to effect movement of material to one side of the roll sections.

9. In a corn harvester having a housing structure defining a fore-and-aft extending stalk passage receiving stalks of corn as the harvester moves forwardly, and chain means having a fore-and-aft extending run adjacent the passage with its terminal end adjacent the rear end of the passage, a pair of fore-and-aft extending ear detaching mechanisms on opposite sides of the passage, each mechanism including a forward ear detaching section adjacent a forward ear detaching section of the opposite mechanism and a coextensive rear roll section adjacent a rear roll section of the other mechanism, said forward section having a rear end transversely opposite the terminal end of the chain run, and said rear roll section being disposed rearwardly of the chain run; means effecting rotation of the roll sections to cause the adjacent sides thereof to move upwardly; and means mounting the ear-detaching mechanisms in the housing structure.

References Cited in the file of this patent

UNITED STATES PATENTS

| | | |
|---|---|---|
| 1,280,207 | Glaze | Oct. 1, 1918 |
| 2,554,198 | Kuhlman | May 22, 1951 |